(12) United States Patent
Tatsuka et al.

(10) Patent No.: US 8,712,176 B2
(45) Date of Patent: Apr. 29, 2014

(54) IMAGE PROCESSOR

(75) Inventors: Toshimitsu Tatsuka, Osaka (JP);
Hiromu Hasegawa, Osaka (JP);
Takeaki Komuro, Osaka (JP); Masato Yamada, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 26 days.

(21) Appl. No.: 13/638,299

(22) PCT Filed: Nov. 29, 2010

(86) PCT No.: PCT/JP2010/071273
§ 371 (c)(1),
(2), (4) Date: Sep. 28, 2012

(87) PCT Pub. No.: WO2011/121844
PCT Pub. Date: Oct. 6, 2011

(65) Prior Publication Data
US 2013/0028534 A1 Jan. 31, 2013

(30) Foreign Application Priority Data

Mar. 31, 2010 (JP) ................................ 2010-083247

(51) Int. Cl.
G06K 9/00 (2006.01)

(52) U.S. Cl.
USPC .......................................... 382/251; 382/232

(58) Field of Classification Search
USPC ......... 382/232, 233, 251; 375/240.01, 240.03
See application file for complete search history.

(56) References Cited

U.S. PATENT DOCUMENTS

| | | |
|---|---|---|
| 5,543,844 A | 8/1996 | Mita et al. |
| 5,956,426 A | 9/1999 | Matsuura et al. |
| 6,091,774 A | 7/2000 | Hyodo et al. |

FOREIGN PATENT DOCUMENTS

| | | |
|---|---|---|
| JP | 4 18857 | 1/1992 |
| JP | 6 276395 | 9/1994 |
| JP | 6 292180 | 10/1994 |
| JP | 7 322254 | 12/1995 |
| JP | 10 215460 | 8/1998 |
| JP | 10 243399 | 9/1998 |
| JP | 10 285597 | 10/1998 |
| JP | 2011 146883 | 7/2011 |

OTHER PUBLICATIONS

U.S. Appl. No. 13/877,068, filed Mar. 29, 2013, Tatsuka et al.
International Search Report Issued Feb. 22, 2011 in PCT/JP10/071273 Filed Nov. 29, 2010.

*Primary Examiner* — Duy M Dang
(74) *Attorney, Agent, or Firm* — Oblon, Spivak, McClelland, Maier & Neustadt, L.L.P.

(57) ABSTRACT

An image processor that achieves reduction in delay amount, in comparison with code amount control GOP by GOP or frame by frame. The controller includes a first processing unit that obtains a generated amount of code used for a first predetermined number of immediately preceding macroblocks, a second processing unit that obtains an allowable amount of code available for a third predetermined number of immediately subsequent macroblocks including a currently target macroblock, based on a target amount of code for not more than a second predetermined number of macroblocks less than a total number of macroblocks included in one frame, and the generated amount of code obtained by the first processing unit, a third processing unit that obtains an expected amount of code expected to be used for the third predetermined number of macroblocks, and a fourth processing unit that sets a quantization parameter of a currently target macroblock, based on the allowable amount of code obtained by the second processing unit and the expected amount of code obtained by the third processing unit.

15 Claims, 7 Drawing Sheets

FIG. 5

| | ACT0 | ACT1 | ACT2 | ACT3 | ACT4 |
|---|---|---|---|---|---|
| REFERENCE AMOUNT OF CODE | 32 bits | 4 bits | 32 bits | 32 bits | 8 bits |
| QPS0 | 20 | 20 | 20 | 20 | 20 |
| QPS1 | 26 | 20 | 26 | 26 | 20 |
| QPS2 | 32 | 20 | 26 | 32 | 20 |
| QPS3 | 32 | 20 | 32 | 38 | 26 |
| QPS4 | 38 | 20 | 38 | 44 | 26 |
| QPS5 | 38 | 26 | 44 | 44 | 32 |
| QPS6 | 44 | 26 | 44 | 44 | 38 |
| QPS7 | 51 | 51 | 51 | 51 | 51 |

PARAMETER SET { QPS0 – QPS7 }

FIG. 6

| | ACT0 | ACT1 | ACT2 | ACT3 | ACT4 |
|---|---|---|---|---|---|
| REFERENCE AMOUNT OF CODE | 32 bits | 4 bits | 32 bits | 32 bits | 8 bits |
| QPS0 | 20 | 20 | 20 | 20 | 20 |
| QPS1 | 26 | 20 | 26 | 26 | 20 |
| QPS2 | 32 | 20 | 26 | 32 | 20 |
| QPS3 | 32 | 20 | 32 | 38 | 26 |
| QPS4 | 38 | 20 | 38 | 44 | 26 |
| QPS5 | 38 | 26 | 44 | 44 | 32 |
| QPS6 | 44 | 26 | 44 | 44 | 38 |
| QPS8 | 52 (SKIP) | 52 (SKIP) | 52 (SKIP) | 52 (SKIP) | 52 (SKIP) |

PARAMETER SET { QPS0 – QPS8 }

FIG. 9

| | ACT0 | ACT1 | ACT2 | ACT3 | ACT4 | ACT5 |
|---|---|---|---|---|---|---|
| REFERENCE AMOUNT OF CODE | 32 bits | 4 bits | 32 bits | 32 bits | 8 bits | 64 bits |
| QPS0 | 20 | 20 | 20 | 20 | 20 | 20 |
| QPS1 | 26 | 20 | 26 | 26 | 20 | 26 |
| QPS2 | 32 | 20 | 26 | 32 | 20 | 32 |
| QPS3 | 32 | 20 | 32 | 38 | 26 | 32 |
| QPS4 | 38 | 20 | 38 | 44 | 26 | 32 |
| QPS5 | 38 | 26 | 44 | 44 | 32 | 32 |
| QPS6 | 44 | 26 | 44 | 44 | 38 | 32 |
| QPS7 | 51 | 51 | 51 | 51 | 51 | 32 |

PARAMETER SET { QPS0–QPS7 }

FIG. 10

| | ACT0 | ACT1 | ACT2 | ACT3 | ACT4 | ACT5 |
|---|---|---|---|---|---|---|
| REFERENCE AMOUNT OF CODE | 32 bits | 4 bits | 32 bits | 32 bits | 8 bits | 64 bits |
| QPS0 | 20 | 20 | 20 | 20 | 20 | 20 |
| QPS1 | 26 | 20 | 26 | 26 | 20 | 26 |
| QPS2 | 32 | 20 | 26 | 32 | 20 | 32 |
| QPS3 | 32 | 20 | 32 | 38 | 26 | 32 |
| QPS4 | 38 | 20 | 38 | 44 | 26 | 32 |
| QPS5 | 38 | 26 | 44 | 44 | 32 | 32 |
| QPS6 | 44 | 26 | 44 | 44 | 38 | 32 |
| QPS8 | 52 (SKIP) | 52 (SKIP) | 52 (SKIP) | 52 (SKIP) | 52 (SKIP) | 32 |

PARAMETER SET { QPS0–QPS8 }

IMAGE PROCESSOR

FIELD OF THE INVENTION

The present invention relates to image processors, and more particularly, to an algorithm for code amount control in moving image compression.

DESCRIPTION OF THE BACKGROUND ART

Code amount control is a technique to optimize an image quality by controlling a generated amount of code (see, for example, Patent Literatures 1 and 2 below). In existing code amount control algorithms, code amount control is generally performed GOP (Group Of Picture) by GOP or frame by frame. In code amount control of frame by frame, for example, an amount of code allotted for one frame is calculated, and a quantization parameter for each macroblock within the frame is controlled so as not to exceed the amount of code.

CITATION LIST

Patent Literature

Patent Literature 1: JP10-215460A
Patent Literature 2: JP10-243399A

SUMMARY OF THE INVENTION

Problems to be Solved by the Invention

Code amount control targeting at amount of code of GOP by GOP or frame by frame achieve improvement in image quality, since an average section to obtain a target constant bit rate is long, and therefore a comparatively great value is allowed for a peak value of a code amount. However, a long average section means a long buffering time, resulting in a great delay amount in encoding. Thus while code amount control performed GOP by GOP or frame by frame is suitable for applications without delay limit such as replay of recorded programs, it is not suitable for applications with rigid delay limit.

The present invention has been made in view of such situation, and is directed to obtaining an image processor that achieves reduction in delay amount, in comparison with code amount control performed GOP by GOP or frame by frame.

Means to Solve the Problems

An image processor according to a first aspect of the present invention includes an encoder that performs encoding including quantization on an image signal and a controller that controls a quantization parameter in the quantization. The controller includes a first processing unit that obtains a generated amount of code used for a first predetermined number of immediately preceding macroblocks, a second processing unit that obtains an allowable amount of code available for a third predetermined number of immediately subsequent macroblocks including a currently target macroblock, based on a target amount of code for not more than a second predetermined number of macroblocks less than a total number of macroblocks included in one frame, and the generated amount of code obtained by the first processing unit, a third processing unit that obtains an expected amount of code expected to be used for the third predetermined number of macroblocks, and a fourth processing unit that sets a quantization parameter of the currently target macroblock, based on the allowable amount of code obtained by the second processing unit and the expected amount of code obtained by the third processing unit.

In the image processor according to the first aspect, the first processing unit obtains a generated amount of code used for a first predetermined number of immediately preceding macroblocks. The second processing unit obtains an allowable amount of code available for a third predetermined number of immediately subsequent macroblocks including a currently target macroblock, based on a target amount of code for not more than a second predetermined number of macroblocks less than a total number of macroblocks included in one frame, and the generated amount of code obtained by the first processing unit. The third processing unit obtains an expected amount of code expected to be used for the third predetermined number of macroblocks. The fourth processing unit sets a quantization parameter of the currently target macroblock, based on the allowable amount of code obtained by the second processing unit and the expected amount of code obtained by the third processing unit. By setting a quantization parameter of a currently target macroblock based on a target amount of code for not more than a second predetermined number of macroblocks less than a total number of macroblocks included in one frame in this way, reduction in delay amount is achieved, in comparison with code amount control performed GOP by GOP or frame by frame.

An image processor according to a second aspect of the present invention is the image processor according to the first aspect, wherein the second processing unit determines, when the first predetermined number is equal to or more than a value obtained by reducing the third predetermined number from the second predetermined number, a value obtained by reducing a generated amount of code used for (the second predetermined number minus the third predetermined number) of immediately preceding macroblocks from the target amount of code from the predetermined number of macroblocks is the allowable amount of code, and when the first predetermined number is less than a value obtained by reducing the third predetermined number from the second predetermined number, a value obtained by reducing a generated amount of code used for the first predetermined number of immediately preceding macroblocks from a target amount of code for a sum of the first predetermined number and the third predetermined number of macroblocks is the allowable amount of code.

In the image processor according to the second aspect, the second processing unit determines, when the first predetermined number is equal to or more than a value obtained by reducing the third predetermined number from the second predetermined number, a value obtained by reducing a generated amount of code used for (the second predetermined number minus the third predetermined number) of immediately preceding macroblocks from the target amount of code for the second the predetermined number of macroblocks is the allowable amount of code, When the first predetermined number is less than a value obtained by reducing the third predetermined number from the second predetermined number, a value obtained by reducing a generated amount of code used for the first predetermined number of immediately preceding macroblocks from a target amount of code for a sum of the first predetermined number and the third predetermined number of macroblocks is determined to be the allowable amount of code. Thus in both of when the first predetermined number is equal to or more than a value obtained by reducing the third predetermined number from the second predetermined number, and when less, an allowable amount of code is adequately obtained.

An image processor according to the third aspect of the present invention is the image processor according to the first or the second aspect, wherein the third processing unit obtains the expected amount of code based on an attribute value of each of the third predetermined number of macroblocks, and determines the attribute value based on an activity evaluation value of an entire area of a macroblock.

In the image processor according to the third aspect, the third processing unit determines the attribute value of each of the third predetermined number of macroblocks based on an activity evaluation value of an entire area of a macroblock. Thus an adequate expected amount of code is realized, by estimating a small quantization parameter (that is, a great amount of code) for macroblocks having, for example, a wholly smooth attribute (that is, macroblocks where image degradation is noticeable).

An image processor according to the fourth aspect of the present invention is the image processor according to the third aspect, wherein the third processing unit further determines the attribute value based on a minimum of activity evaluation values of each of four side areas of the macroblock.

In the image processor according to the fourth aspect, the third processing unit determines the attribute value based on a minimum of activity evaluation values of each of four side areas of the macroblock. In contrast, for macroblocks having an attribute of, for example, being wholly complex and not including a character area, but including a smooth part in a part (that is, macroblocks where image degradation is noticeable in the smooth part), an adequate expected amount of code is realized by estimating a somewhat small quantization parameter (that is, a somewhat great amount of code).

An image processor according to the fifth aspect of the present invention is the image processor according to the third or the fourth aspect, wherein the third processing unit further determines the attribute value based on a maximum of results of edge detection of each of the four side areas of the macroblock.

In the image processor according to the fifth aspect, the third processing unit determines the attribute value based on a maximum of results of edge detection of each of the four side areas of the macroblock. Thus an adequate expected amount of code is realized, by estimating a moderate quantization parameter (that is, a moderate amount of code) for macroblocks having an attribute of, for example, being wholly complex and including a character area in a part (that is, macroblocks where image degradation is noticeable in the character area).

An image processor according to the sixth aspect of the present invention is the image processor according to any one of the third to the fifth aspects, wherein the third processing unit further determines the attribute value based on whether or not the macroblock is an intra macroblock.

In the image processor according to the sixth aspect, the third processing unit further determines the attribute value based on whether or not the macroblock is an intra macroblock. Thus an adequate expected amount of code is realized, by estimating a great amount of code for, for example, intra macroblocks.

An image processor according to seventh aspect of the present invention is the image processor according to any one of the third to the sixth aspects, wherein a reference amount of code when a quantization parameter is set at a reference value is preset corresponding to each of a plurality of attribute values, a plurality of parameter sets each having quantization parameters respectively corresponding to the plurality of attribute values is preset, and the third processing unit calculates the expected amount of code based on the reference amount of code for each of the plurality of parameter sets.

In the image processor according to the seventh aspect, third processing unit calculates the expected amount of code based on the reference amount of code for each of the plurality of parameter sets. Thus an adequate expected amount of code is realized for each of the parameter sets, by setting the reference amount of code adequately.

An image processor according to the eighth aspect of the present invention is the image processor according to the seventh aspect, wherein the third processing unit corrects the reference amount of code based on an actually generated amount of code.

In the image processor according to the eighth aspect, the third processing unit corrects the reference amount of code based on an actually generated amount of code. Thus even when the initial value set for the reference amount of code is not accurate, the reference amount of code is corrected based on the actually generated amount of code, so as to subsequently obtain an accurate expected amount of code.

An image processor according to the ninth aspect of the present invention is the image processor according to the eighth aspect, wherein the third processing unit calculates a corrected reference amount of code based on an actually generated amount of code when a quantization parameter is set at a value different from the reference value.

In the image processor according to the ninth aspect, the third processing unit calculates a corrected reference amount of code based on an actually generated amount of code when a quantization parameter is set at a value different from the reference value. Thus compared to encoding with a quantization parameter of the reference value and correcting the reference amount of code based on an amount of code actually generated in the encoding, the amount of calculation is reduced as a whole, with no necessity for additional encoding.

An image processor according to the 10-th aspect of the present invention is the image processor according to the eighth aspect, wherein the third processing unit performs encoding with a quantization parameter of the reference value and corrects the reference amount of code based on an amount of code actually generated in the encoding.

In the image processor according to the 10-th aspect, the third processing unit performs encoding with a quantization parameter of the reference value and corrects the reference amount of code based on an amount of code actually generated in the encoding. Thus compared to calculating a corrected reference amount of code based on an actually generated amount of code when a quantization parameter is set at a value different from the reference value, correction accuracy is improved.

An image processor according to the 11-th aspect of the present invention is the image processor according to any one of the seventh to the ninth aspects, wherein a quantization parameter of an intra macroblock in each of the plurality of parameter sets is equal to or below a predetermined upper limit.

In the image processor according to the 11-th aspect, a quantization parameter of an intra macroblock in each of the plurality of parameter sets is equal to or below a predetermined upper limit. Thus in employing an algorithm where quantization parameters of intra macroblocks are set equal to or below a predetermined upper limit, an adequate expected amount of code is realized with the settings properly reflected.

An image processor according to the 12-th aspect of the present invention is the image processor according to any one of the seventh to the 11-th aspects, wherein the fourth processing unit selects a parameter set that realizes a greatest expected amount of code equal to or less than the allowable amount of code of the plurality of parameter sets, and sets a quantization parameter of a currently target macroblock based on the parameter set.

In the image processor according to the 12-th aspect, the fourth processing unit selects a parameter set that realizes a greatest expected amount of code equal to or less than the allowable amount of code of the plurality of parameter sets. Thus the generated amount of code is kept not greater than the target amount of code, while improving the image quality to a maximum extent.

An image processor according to the 13-th aspect of the present invention is the image processor according to any one of the seventh to the 11-th aspects, wherein the fourth processing unit selects a parameter set that realizes the expected amount of code closest to the allowable amount of code from the plurality of parameter sets, and sets a quantization parameter of a currently target macroblock based on the parameter set.

In the image processor according to the 13-th aspect, the fourth processing unit selects a parameter set that realizes the expected amount of code closest to the allowable amount of code from the plurality of parameter sets. Thus since the generated amount of code is brought close to the target amount of code, reliable code amount control is realized.

An image processor according to the 14-th aspect of the present invention is the image processor according to any one of the seventh to the 13-th aspects, wherein the fourth processing unit skips encoding of a currently target macroblock when a parameter set that causes the expected amount of code to be smallest is selected from the plurality of parameter sets and still the expected amount of code exceeds the allowable amount of code.

In the image processor according to the 14-th aspect, the fourth processing unit skips encoding of a currently target macroblock when a parameter set that causes the expected amount of code to be smallest is selected from the plurality of parameter sets and still the expected amount of code exceeds the allowable amount of code. That is, encoding of the macroblock is omitted and a value of the macroblock in the same position within an immediately preceding frame is applied for this macroblock. Although this results in image degradation of the macroblock, the generated amount of code is reduced by omitting encoding, and thus the allowable amount of code for subsequent processing of the macroblock becomes greater.

An image processor according to the 15-th aspect of the present invention is the image processor according to any one of the 12-th to the 14-th aspects, wherein the fourth processing unit sets a quantization parameter of a currently target macroblock to a predetermined upper limit or smaller when the macroblock is an intra macroblock.

In the image processor according to the 15-th aspect, the fourth processing unit sets a quantization parameter of a currently target macroblock to a predetermined upper limit or smaller when the macroblock is an intra macroblock. With the intra macroblocks, image degradation tends to be noticeable when the quantization parameter is set at a great value, and therefore providing the upper limit for the quantization parameter of the intra macroblocks suppresses image degradation.

Effects of the Invention

The present invention achieves reduction in delay amount, in comparison with code amount control performed GOP by GOP or frame by frame.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a diagram illustrating a first example of parameter sets.

FIG. 6 is a diagram illustrating a second example of the parameter sets.

FIG. 9 is a diagram illustrating a third example of the parameter sets.

FIG. 10 is a diagram illustrating a fourth example of the parameter sets.

DESCRIPTION OF THE INVENTION

Figure 1:
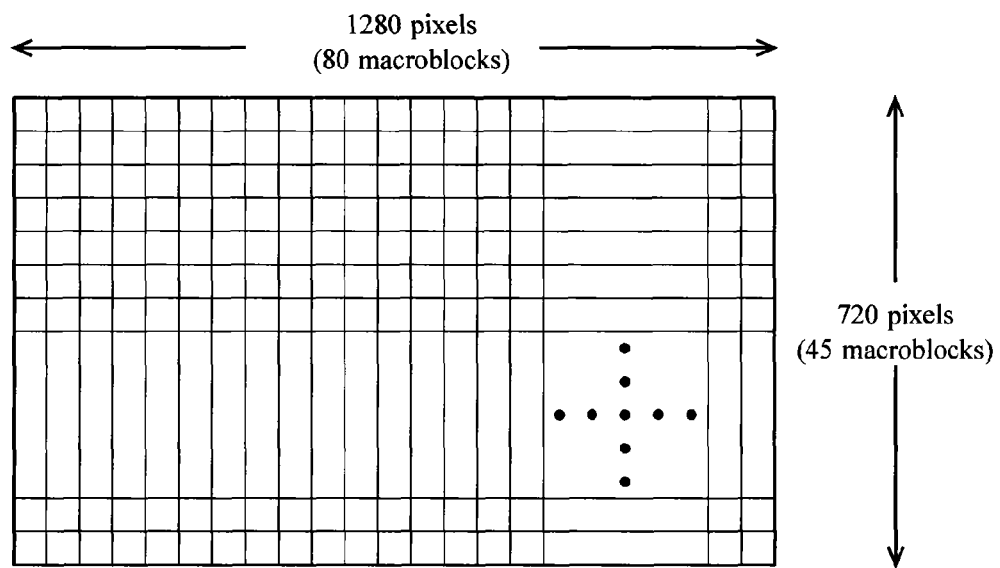
FIG. 1 is a diagram illustrating an example of encoding macroblock by macroblock.

Preferred embodiments of the present invention are described in detail below referring to the drawings. It should be noted that identical reference numerals throughout the drawings indicate identical or equivalent elements.

FIG. 1 is a diagram illustrating an example of encoding macroblock by macroblock. FIG. 1 illustrates an example of an image of one frame having 1280 pixels in row (horizontally) and 720 pixels in column (vertically). One frame is divided into macroblocks for each 16 pixels in row and for each 16 pixels in column. Thus one frame is divided into 80 macroblocks in row and 45 macroblocks in column. A group of 80 macroblocks equivalent of one row is referred to as macroblock line.

Figure 2:
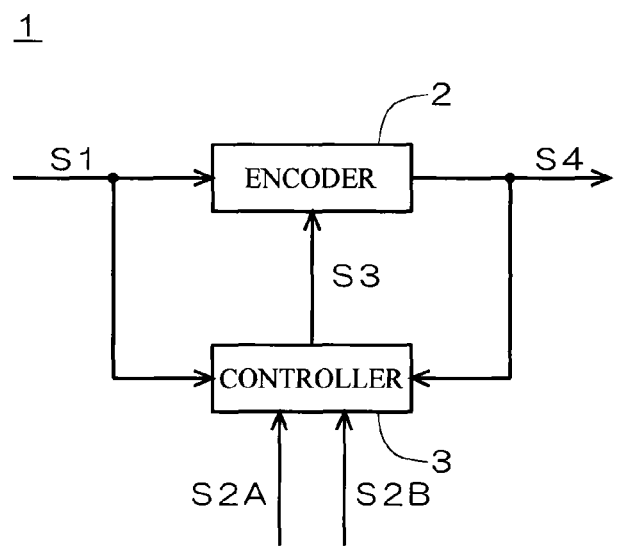
FIG. 2 is a block diagram illustrating a configuration of an image processor according to the present invention.

FIG. 2 is a block diagram illustrating a configuration of an image processor 1 according to Embodiment 1 of the present invention. As illustrated in FIG. 2, the image processor 1 includes an encoder 2 and a controller 3. The encoder 2 is in conformity to standards for a moving image such as MPEG-2, MPEG-4, and H.264, and performs image processing such as quantization and encoding on an image signal S1 that is before compression coding, so as to output a compression-coded image signal S4. The image signal S4 is transmitted from the image processor 1 to a display device (not illustrated) by a wireless LAN or the like, and the display device displays a moving image.

The controller 3 receives an input of the image signals S1 and S4, and also an input of a signal S2A indicating a maximum allowable amount of code for one macroblock and a signal S2B indicating a target amount of code for one macroblock. The maximum allowable amount of code for one macroblock is calculated based on a maximum bit rate (for example, 9 Mbps) from the image processor 1 to the display device, a frame rate (for example, 60 fps) of the moving image, and a total number (for example, 3600) of macroblocks within one frame. Similarly, the target amount of code for one macroblock is calculated based on a target bit rate (for example, 8.1 Mbps) from the image processor 1 to the display device, the frame rate of the moving image, and the total number of macroblocks within one frame. The controller 3 controls the quantization parameter for quantization in the encoder 2 with a control signal S3, based on the signals S1, S2A, S2B, and S4. In the image processor 1 according to the present embodiment, the quantization parameter is controlled so that an amount of code generated for X macroblocks (for example, 1200 macroblocks included in 15 macroblock lines) equivalent of allowable transit delay does not exceed a maximum allowable amount of code (for example, 9000000/60/3=50000 bits) for X macroblocks.

Figure 3:
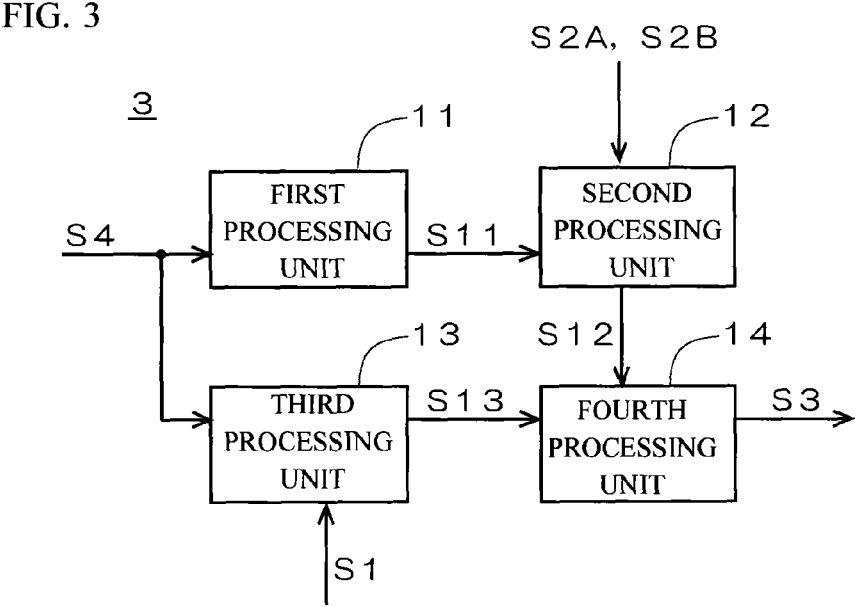
FIG. 3 is a block diagram illustrating an example of the configuration of a controller illustrated in FIG. 2.

FIG. 3 is a block diagram illustrating an example of the configuration of the controller 3 illustrated in FIG. 2. As illustrated in relation of connection in FIG. 3, the controller 3 includes a first processing unit 11, a second processing unit 12, a third processing unit 13, and a fourth processing unit 14.

The first processing unit 11 obtains a generated amount of code used for Y macroblocks processed immediately before, based on the image signal S4. The obtained generated amount of code is inputted as a signal S11 from the first processing unit 11 to the second processing unit 12.

The second processing unit 12 obtains a target amount of code for X macroblocks, based on the signals S2A and S2B. The second processing unit 12 also obtains an allowable amount of code available for N macroblocks (for example, 80 macroblocks included in one macroblock line starting with a currently target macroblock) to be processed immediately afterward, based on the obtained target amount of code and the generated amount of code for Y macroblocks inputted from the first processing unit 11. The obtained allowable amount of code is inputted as a signal S12 from the second processing unit 12 to the fourth processing unit 14.

When the number of macroblocks (Y) for which the generated amount of code has already been obtained is equal to or more than a value obtained by reducing the number of macroblocks (N) for which an amount of code to be generated can be expected from the number of macroblocks (X) equivalent of allowable transit delay (that is, when Y≥X−N is met), the second processing unit 12 determines a value obtained by reducing a generated amount of code used for an immediately preceding X−N macroblocks from the target amount of code for X macroblocks is an allowable amount of code available for N macroblocks to be processed immediately afterward. In contrast, when the number of macroblocks (Y) for which the generated amount of code has already been obtained is less than a value obtained by reducing the number of macroblocks (N) for which an amount of code to be generated can be expected from the number of macroblocks (X) equivalent of allowable transit delay (that is, when Y<X−N is met), the second processing unit 12 determines a value obtained by reducing a generated amount of code used for an immediately preceding Y macroblocks from the target amount of code for Y+N macroblocks is an allowable amount of code available for N macroblocks to be processed immediately afterward. Thus in both of when Y≥X−N and when Y<X−N, an allowable amount of code is adequately obtained.

The third processing unit 13 obtains an expected amount of code expected to be used for immediately subsequent N macroblocks, based on the image signal S1 (details are described below). The obtained expected amount of code is inputted as a signal S13 from the third processing unit 13 to the fourth processing unit 14.

The fourth processing unit 14 sets a quantization parameter of the currently target macroblock, based on the allowable amount of code inputted from the second processing unit 12 and the expected amount of code inputted from the third processing unit 13 (details are described below). The quantization parameter as set is inputted as signal S3 from the fourth processing unit 14 to the encoder 2 illustrated in FIG. 2.

Figure 4:
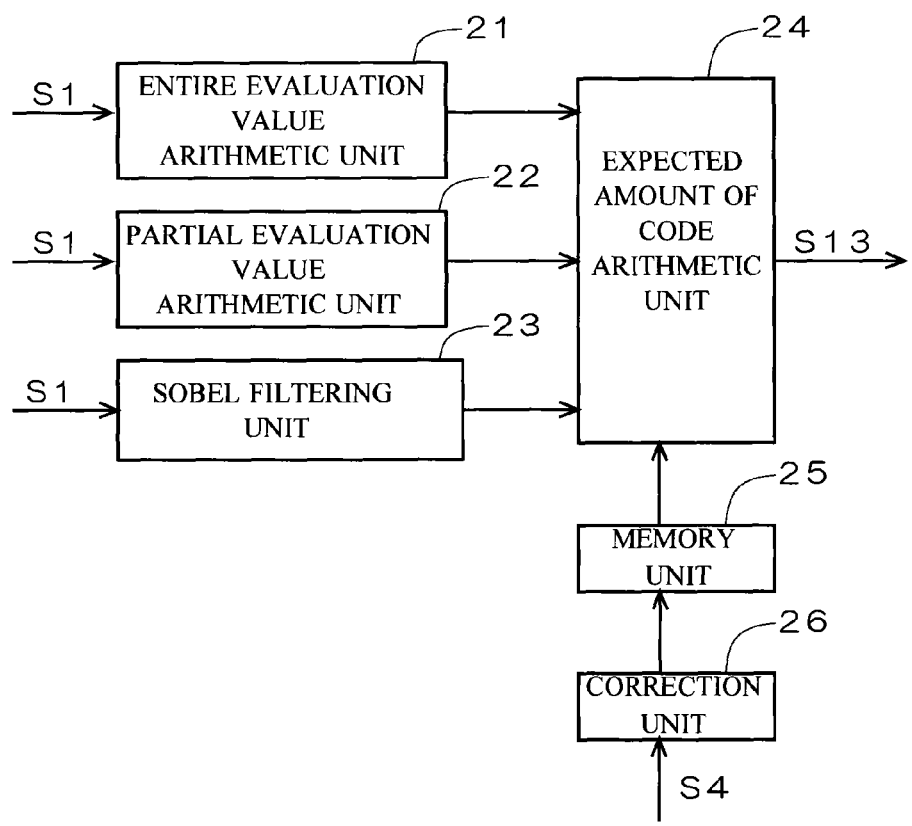
FIG. 4 is a block diagram illustrating an example of the configuration of a third processing unit illustrated in FIG. 3.

FIG. 4 is a block diagram illustrating an example of the configuration of the third processing unit 13 illustrated in FIG. 3. As illustrated in relation of connection in FIG. 4, the third processing unit 13 includes an entire evaluation value arithmetic unit 21, a partial evaluation value arithmetic unit 22, a Sobel filtering unit 23, an expected amount of code arithmetic unit 24, a memory unit 25, and a correction unit 26.

The entire evaluation arithmetic unit 21 calculates an activity evaluation value act1 of the entire area of each macroblock (16 pixels in column×16 pixels in row) of the immediately subsequent N macroblocks, based on the image signal S1. The activity evaluation value is an index which indicates variability in pixel values within a macroblock, obtained by, for example, dividing a sum of absolute differences between an average luminance value and luminance values of each pixel of the macroblock by the number of pixels within the macroblock. Employing such an activity evaluation value act1 realizes an adequate expected amount of code, by estimating a small quantization parameter (that is, a great amount of code) for macroblocks having a wholly smooth attribute (that is, macroblocks where image degradation is noticeable).

The partial evaluation value arithmetic unit 22 calculates a minimum act2 of activity evaluation values of multiple partial areas of each macroblock of the immediately subsequent N macroblocks, based on the image signal S1. More specifically, activity evaluation values are calculated for each of an area of 4 pixels in column×16 pixels in row including the upper side of each macroblock, an area of 4 pixels in column×16 pixels in row including the base, an area of 16 pixels in column×4 pixels in row including the left side, and an area of 16 pixels in column×4 pixels in row including the right side, and a minimum act2 among them are obtained. Employing such a minimum act2 realizes an adequate expected amount of code, by estimating a great quantization parameter (that is, a small amount of code) for macroblocks having an attribute of, for example, being wholly complex, not including a character area, and not including a smooth part in a part (that is, macroblocks where image degradation is not noticeable). In contrast, for macroblocks having an attribute of, for example, being wholly complex and not including a character area, but including a smooth part in a part (that is, macroblocks where image degradation is noticeable in the smooth part), an adequate expected amount of code is realized by estimating a somewhat small quantization parameter (that is, a somewhat great amount of code).

The Sobel filtering unit 23 performs edge detection with a Sobel filter for multiple partial areas of each macroblock of the immediately subsequent N macroblocks, based on the image signal S1, and obtains a maximum Sobel of the results of filtering. More specifically, edge detection is performed on an area of 4 pixels in column×16 pixels in row including the upper side of each macroblock, an area of 4 pixels in column×16 pixels in row including the base, an area of 16 pixels in column×4 pixels in row including the left side, and an area of 16 pixels in column×4 pixels in row including the right side, and a maximum Sobel among the results of filtering is obtained. Employing such a maximum Sobel realizes an adequate expected amount of code, by estimating a moderate quantization parameter (that is, a moderate amount of code) for macroblocks having an attribute of, for example, being wholly complex and including a character area in a part (that is, macroblocks where image degradation is noticeable in the character area).

FIG. 5 is a diagram illustrating a first example of parameter sets stored in the memory unit 25 illustrated in FIG. 4. Parameter sets QPS0 to QPS7 each have quantization parameters being set corresponding to each of attribute values ACT0 to ACT4 of a macroblock. For example, the parameter set QPS4 has a quantization parameter set at a value "38" corresponding to the attribute value ACT0, a quantization parameter set at "20" corresponding to the attribute value ACT1, a quantization parameter set at "38" corresponding to the attribute value ACT2, a quantization parameter set at "44" corresponding to the attribute value ACT3, and a quantization parameter set at "26" corresponding to the attribute value ACT4. Moreover, for example, the parameter set QPS7 has quantization parameters set at "51" corresponding to the attribute values ACT0 to ACT4.

Furthermore, amounts of code supposed to be generated when the quantization parameter is set at a reference value (for example, at a maximum value "51" by the H.264 standard) (reference amount of code) are also set corresponding to the attribute values ACT0 to ACT4 of the macroblock. In this example, the reference amounts of code of 32 bits, 4 bits, 32 bits, 32 bits, and 8 bits are respectively set corresponding to the attribute value ACT0, the attribute value ACT1, the attribute value ACT2, the attribute value ACT3, and the attribute value ACT4. Adequately setting reference amounts of code achieves adequate expected amounts of code for each of the multiple parameter sets QPS0 to QPS7.

FIG. 6 is a diagram illustrating a second example of the parameter sets stored in the memory unit 25 illustrated in FIG. 4. A parameter set QPS8 is defined instead of the parameter set QPS7 illustrated in FIG. 5. The parameter set QPS8 has quantization parameters set at "52" corresponding to the attribute values ACT0 to ACT4. The quantization parameter of "52" here means skipping encoding. More specifically, this means that encoding is not performed on a macroblock for which the quantization parameter is set at "52", and a value for a macroblock in the same place within an immediately preceding frame is applied for this macroblock.

Referring to FIG. 4, the expected amount of code arithmetic unit 24 obtains an expected amount of code expected to be used for immediately subsequent N macroblocks, based on the activity evaluation value act1 obtained by the entire evaluation value arithmetic unit 21, the minimum act2 obtained by the partial evaluation value arithmetic unit 22, the maximum Sobel obtained by the Sobel filtering unit 23, and the parameter sets read from the memory unit 25, for each of the immediately subsequent N macroblocks. The details are as follows.

Figure 7:
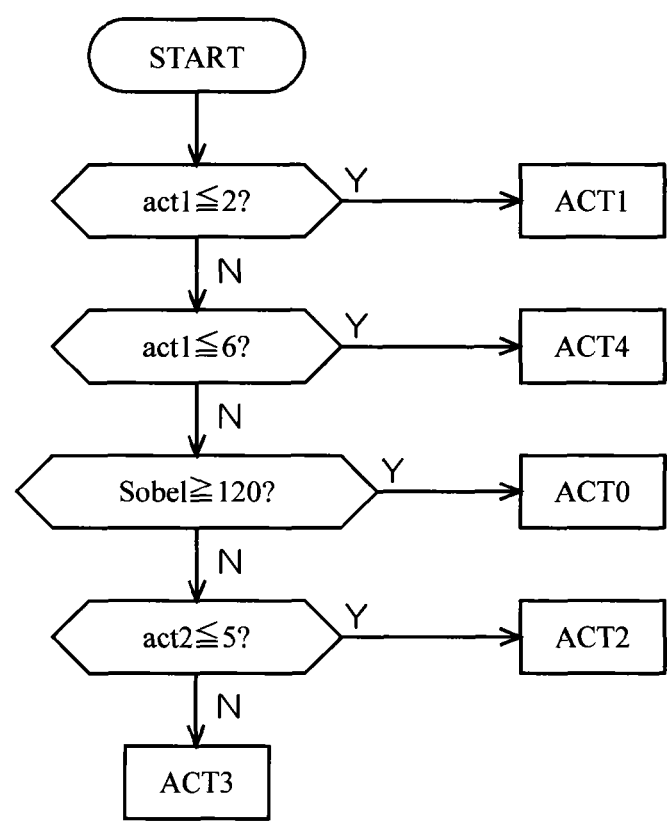
FIG. 7 is a flow chart illustrating an example of how an attribute value is determined.

The expected amount of code arithmetic unit 24 firstly determines an attribute value for each of the immediately subsequent N macroblocks. FIG. 7 is a flow chart illustrating an example of how the attribute value is determined. As illustrated in a flow chart of FIG. 7, the attribute value of each macroblock is determined to be the attribute value ACT1 when a first condition that the activity evaluation value act1 is "2" or smaller is met, the attribute value ACT4 when the first condition is not met and a second condition that the activity evaluation value act1 is "6" or smaller is met, the attribute value ACT0 when the second condition is not met and a third condition that the maximum Sobel is "120" or greater is met, the attribute value ACT2 when the third condition is not met and a fourth condition that the minimum act2 is "5" or smaller is met, and the attribute value ACT3 when the fourth condition is not met. The expected amount of code arithmetic unit 24 counts how many macroblocks having an attribute value determined to be each of the attribute values ACT0 to ACT4 are included in the immediately subsequent N macroblocks.

The expected amount of code arithmetic unit 24 next calculates total expected amounts of code of the immediately subsequent N macroblocks, for the cases when each of the parameter sets QPS0 to QPS6 is applied. As illustrated in FIGS. 5 and 6, the quantization parameters of the parameter sets QPS0 to QPS6 are set at any one of "20", "26", "32", "38", "44" and "51". According to H.264 standard, the quantization accuracy is doubled when the quantization parameter decreases by "6". Thus amounts of code supposed to be generated when the quantization parameter is set at "20", "26", "32", "38", "44", and "51" are respectively 32 times, 16 times, eight times, four times, two times, and one time the reference amount of code. Thus when the immediately subsequent N macroblocks include K0, K1, K2, K3, and K4 macroblocks determined to have the attribute values ACT0, ACT1, ACT2, ACT3, and ACT4, respectively, the total expected amount of code when, for example, the parameter set QPS4 is applied is obtained by 32(bits)×4(times)×K0+4×32×K1+32×4×K2+32×2×K3+8×16×K4. The expected amount of code arithmetic unit 24 also calculates the total expected amounts of code when the other parameter sets QPS0 to QPS3, QPS5, and QPS6 are applied, in the same manner as above. Then the total expected amounts of code when each of the parameter sets QPS0 to QPS6 is applied are inputted as signal S13 to the fourth processing unit 14 illustrated in FIG. 3.

Figure 8:
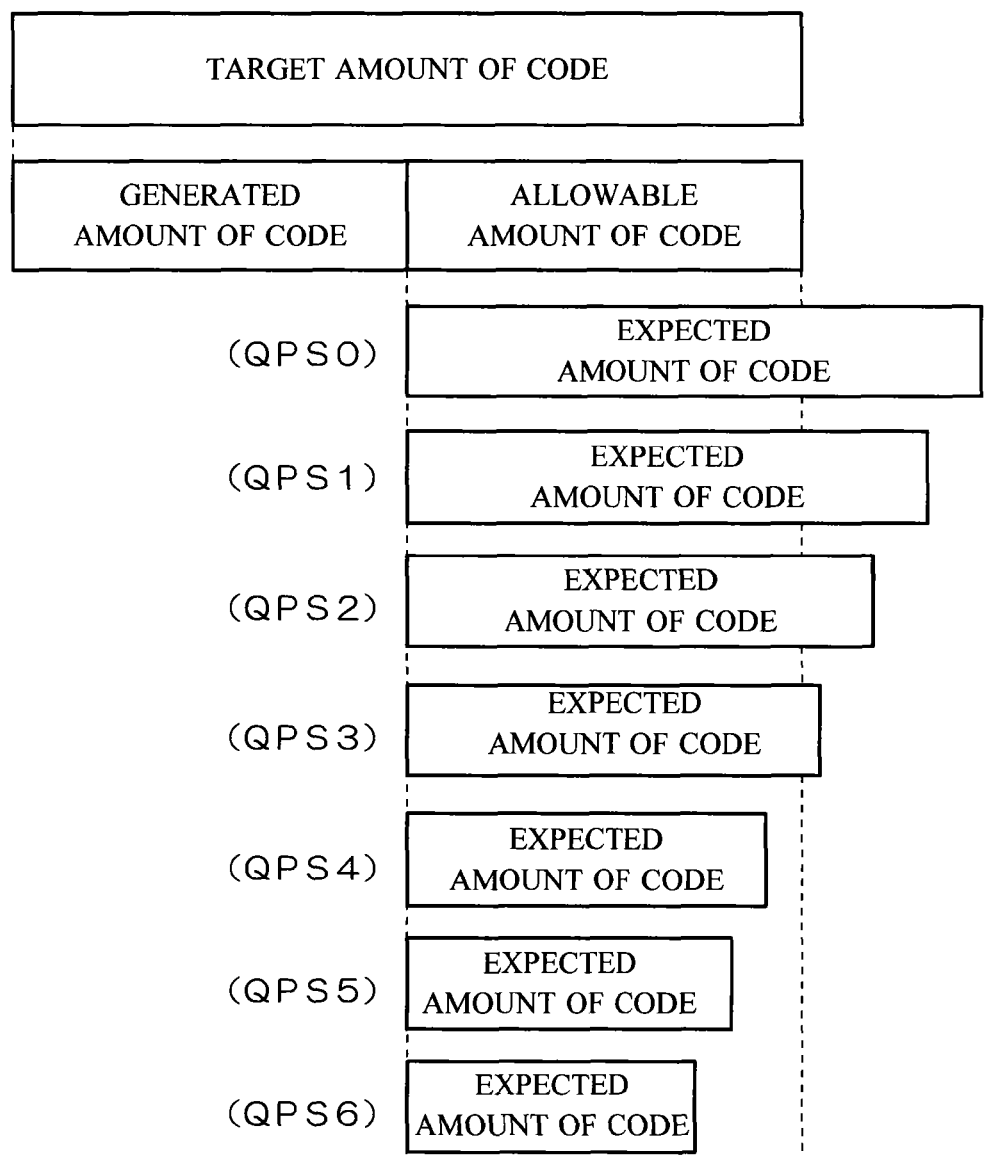
FIG. 8 is a diagram illustrating an example of how a parameter set is selected.

FIG. 8 is a diagram illustrating an example of how the fourth processing unit 14 selects a parameter set. The allowable amount of code of the immediately subsequent N macroblocks is obtained by reducing an amount of code generated for X−N macroblocks processed immediately before from a target amount of code of X macroblocks.

The fourth processing unit 14 selects a parameter set that realizes the greatest expected amount of code equal to or less than the allowable amount of code, from the parameter sets QPS0 to QPS6. In the example illustrated in FIG. 8, the parameter set QPS4 is selected. Then the fourth processing unit 14 sets a quantization parameter of the currently target macroblock, based on the selected parameter set QPS4. For example, when the attribute value of the currently target macroblock is the attribute value ACT0, the quantization parameter of this macroblock is set to "38" defined at the point where QPS4 meets the ACT0 in FIG. 5 or FIG. 6. In this example, the generated amount of code is kept not greater than the target amount of code, while improving the image quality to a maximum extent.

For another example, the fourth processing unit 14 selects a parameter set that realizes the expected amount of code closest to the allowable amount of code, from the parameter sets QPS0 to QPS6. In the example illustrated in FIG. 8, the parameter set QPS3 is selected. The fourth processing unit 14 sets a quantization parameter of the currently target macroblock, based on the selected parameter set QPS3. For example, when the attribute value of the currently target macroblock is the attribute value ACT0, the quantization parameter of this macroblock is set to "32" defined at the point where QPS3 meets the ACT0 in FIG. 5 or 6. In this example, since the generated amount of code is brought close to the target amount of code, reliable code amount control is realized. It should noted in this example that if the expected amount of code exceeds the allowable amount of code, resulting in the sum of the generated amount of code and the expected amount of code reaching, for example, 105% of the target amount of code or greater, selection of a parameter set which would cause the expected amount of code to exceed the allowable amount of code may be prohibited.

Moreover, when the parameter set QPS6 that causes the expected amount of code to be smallest is selected from the parameter sets QPS0 to QPS6 and still the expected amount of code exceeds the allowable amount of code, the fourth processing unit 14 selects the parameter set QPS7 illustrated in FIG. 5 or the parameter set PQS8 illustrated in FIG. 6. When the parameter set QPS7 is selected, the quantization parameter of the currently target macroblock is set to the maximum value according to the standard, "51". However, when the currently target macroblock is an intra macroblock as described below, the quantization parameter is set to the upper limit "32". When the parameter set QPS8 is selected, encoding of the currently target macroblock is skipped. However, when the currently target macroblock is an intra macroblock as described below, the quantization parameter is set to the upper limit "32". Although skipping encoding results in image degradation of the macroblock, the generated amount of code is reduced by omitting encoding, and thus the allowable amount of code for subsequent processing of the macroblock becomes greater.

Target macroblocks to be processed by the image processor 1 include intra macroblocks at a predetermined rate (for example, at a rate of one per one macroblock line). In the image processor 1 according to the present embodiment, the quantization parameter of the intra macroblocks has a predetermined upper limit (in this example, "32"). When the currently target macroblock is an intra macroblock, the fourth processing unit 14 sets the quantization parameter of the currently target macroblock at a value equal to or smaller than the upper limit.

Referring to FIG. 4, the correction unit 26 corrects the reference amount of code illustrated in FIGS. 5 and 6, based on the expected amount of code obtained for a certain macroblock and the amount of code actually generated for the macroblock. With such correction of the reference amount of code, even when the initial value set for the reference amount of code is not accurate, the reference amount of code is corrected based on the actually generated amount of code, so as to subsequently obtain an accurate expected amount of code.

For a first example, the correction unit 26 obtains an actually generated amount of code for specific macroblocks other than intra macroblocks of the immediately subsequent N macroblocks, based on the image signal S4. The correction unit 26 also calculates a generated amount of code on an assumption that the quantization parameter is set at "51", based on the amount of code actually generated for the above specific macroblocks and the quantization parameter set for the specific macroblocks. For example, when the quantization parameter is set at "32", the actually generated amount of code is divided by "8" to obtain the generated amount of code on the assumption that the quantization parameter is set at "51". Then when this generated amount of code is greater than a preset initial value of the reference amount of code, the value of the reference amount of code is updated from the initial value to the value of this generated amount of code. Such correction of the reference amount of code is performed regularly, and when the value of the generated amount of code gets smaller than the initial value of the reference amount of code, the value of the reference amount of code is returned to the initial value. Compared to the below described second example, the amount of calculation is reduced as a whole in the first example, with no necessity for additional encoding.

In a second example, in encoding the above specific macroblock in the encoder 2, parallel, additional encoding is performed with the quantization parameter being set at the reference value ("51" in this example). The correction unit 26 corrects the value of the reference amount of code with the amount of code actually generated in this additional encoding. For example, the value of the reference amount of code is updated from a preset initial value to this actually generated amount of code. Compared to the above first example, correction accuracy is improved in the second example.

As described above, in the image processor 1 according to the present embodiment, the first processing unit 11 obtains a generated amount of code used for Y macroblocks processed immediately before. The second processing unit 12 obtains an allowable amount of code available for immediately subsequent N macroblocks including the currently target macroblock, based on a target amount of code for X macroblocks and the generated amount of code obtained by the first processing unit 11. The third processing unit 13 obtains an expected amount of code expected to be used for immediately subsequent N macroblocks. The fourth processing unit 14 sets a quantization parameter of the currently target macroblock, based on the allowable amount of code obtained by the second processing unit 12 and the expected amount of code obtained by the third processing unit 13. Setting the quantization parameter of the currently target macroblock based on a target amount of code for X macroblocks less than the total number of macroblocks included in one frame (Y+N macroblocks, in some cases), as described above, achieves reduced delay amount, compared to code amount control performed GOP by GOP or frame by frame.

<Modification>

FIG. 9 is a diagram illustrating a third example of the parameter sets stored in the memory unit 25 illustrated in FIG. 4. Parameter sets QPS0 to QPS7 each have quantization parameters being set corresponding to each of attribute values ACT0 to ACT5 of a macroblock. For example, the parameter set QPS4 has a quantization parameter set at a value "38" corresponding to the attribute value ACT0, a quantization parameter set at "20" corresponding to the attribute value ACT1, a quantization parameter set at "38" corresponding to the attribute value ACT2, a quantization parameter set at "44" corresponding to the attribute value ACT3, a quantization parameter set at "26" corresponding to the attribute value ACT4, and a quantization parameter set at "32" corresponding to the attribute value ACT5. Moreover, the parameter set QPS7 has quantization parameters set at "51" corresponding to the attribute values ACT0 to ACT4, and at "32" corresponding to the attribute value ACT5.

Furthermore, amounts of code supposed to be generated when the quantization parameter is set at a reference value (for example, at a maximum value "51" by the H.264 standard) (reference amount of code) are also set corresponding to the attribute values ACT0 to ACT5 of the macroblock. In this example, the reference amounts of code of 32 bits, 4 bits, 32 bits, 32 bits, 8 bits, and 64 bits are respectively set corresponding to the attribute value ACT0, the attribute value ACT1, the attribute value ACT2, the attribute value ACT3, the attribute value ACT4, and the attribute value ACT5.

FIG. 10 is a diagram illustrating a fourth example of the parameter sets stored in the memory unit 25 illustrated in FIG. 4. Parameter set QPS8 are defined instead of the parameter set QPS7 illustrated in FIG. 9. The parameter set QPS8 has quantization parameters set at "52" corresponding to the attribute values ACT0 to ACT4, and at "32" corresponding to the attribute value ACT5.

Referring to FIG. 4, the expected amount of code arithmetic unit 24 obtains an expected amount of code expected to be used for immediately subsequent N macroblocks, based on the activity evaluation value act1 obtained by the entire evaluation value arithmetic unit 21, the minimum act2 obtained by the partial evaluation value arithmetic unit 22, the maximum Sobel obtained by the Sobel filtering unit 23, and the parameter sets read from the memory unit 25, for each of the immediately subsequent N macroblocks. The details are as follows.

Figure 11:
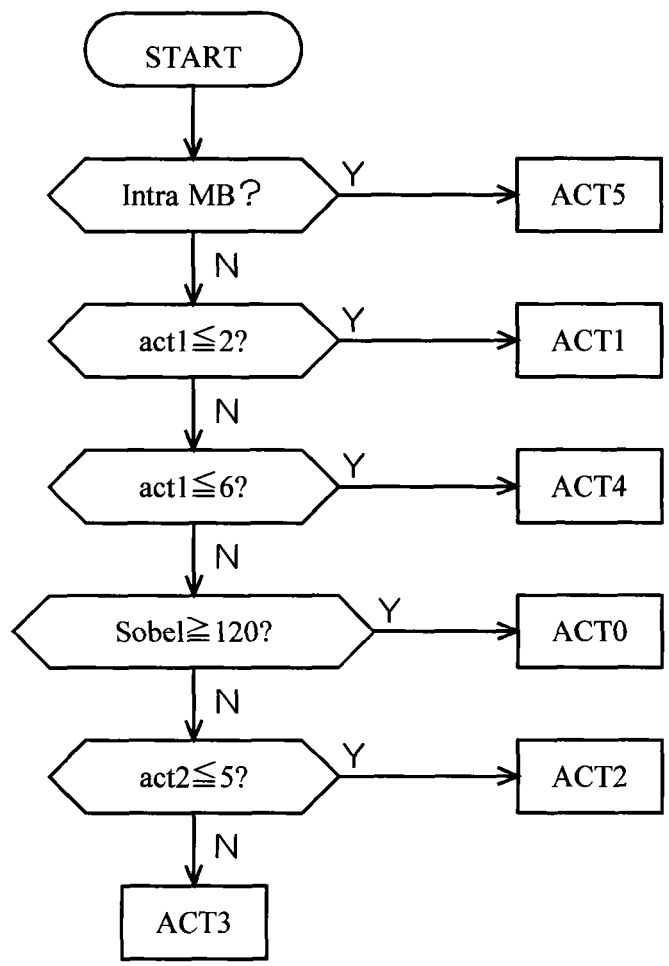
FIG. 11 is a flow chart illustrating an example of how an attribute value is determined.

The expected amount of code arithmetic unit 24 firstly determines an attribute value for each of the immediately subsequent N macroblocks. FIG. 11 is a flow chart illustrating an example of how the attribute value is determined As illustrated in a flow chart of FIG. 11, the attribute value of each macroblock is determined to be the attribute value ACT5 when a first condition that the macroblock is an intra macroblock (macroblocks for which inter-frame prediction is not employed) is met, the attribute value ACT1 when the first condition is not met and a second condition that the activity evaluation value act1 is "2" or smaller is met, the attribute value ACT4 when the second condition is not met and a third condition that the activity evaluation value act1 is "6" or smaller is met, the attribute value ACT0 when the third condition is not met and a fourth condition that the maximum Sobel is "120" or greater is met, the attribute value ACT2 when the fourth condition is not met and a fifth condition that the minimum act2 is "5" or smaller is met, and the attribute value ACT3 when the fifth condition is not met. The expected amount of code arithmetic unit 24 counts how many macroblocks having an attribute value determined to be each of the attribute values ACT0 to ACT5 are included in the immediately subsequent N macroblocks.

The expected amount of code arithmetic unit 24 next calculates total expected amounts of code of the immediately subsequent N macroblocks, for the cases when each of the parameter sets QPS0 to QPS6 is applied. As illustrated in FIGS. 9 and 10, the quantization parameters of the parameter sets QPS0 to QPS6 are set at any one of "20", "26", "32", "38", "44" and "51". According to H.264 standard, the quantization accuracy is doubled when the quantization parameter decreases by "6". Thus amounts of code supposed to be generated when the quantization parameter is set at "20", "26", "32", "38", "44", and "51" are respectively 32 times, 16 times, eight times, four times, two times, and one time the reference amount of code. Thus when the immediately subsequent N macroblocks include K0, K1, K2, K3, K4, and K5 macroblocks determined to have the attribute values ACT0, ACT1, ACT2, ACT3, ACT4, and ACT5 respectively, the total expected amount of code when, for example, the parameter set QPS4 is applied is obtained by 32(bits)×4(times)×K0+4× 32×K1+32×4×K2+32×2×K3+8×16×K4+64×8×K5. The expected amount of code arithmetic unit 24 also calculates the total expected amounts of code when the other parameter sets QPS0 to QPS3, QPS5, and QPS6 are applied, in the same manner as above. Then the total expected amounts of code when each of the parameter sets QPS0 to QPS6 is applied are inputted as signal S13 to the fourth processing unit 14 illustrated in FIG. 3.

In the above embodiment, an exceptional processing is performed to set the quantization parameter to the upper limit "32" or smaller when the currently target macroblock is an intra macroblock. In contrast, as illustrated in FIG. 9 or 10, the attribute value ACT5 for intra macroblocks are defined in the parameter sets according to the present modification. Then the quantization parameter corresponding to the attribute value ACT5 is set at the upper limit "32" or smaller. Thus when the immediately subsequent N macroblocks include an intra macroblock, the expected amount of code arithmetic unit 24 sets the quantization parameter of the macroblock to the upper limit "32" or smaller, in accordance with FIG. 9 or 10. Consequently, the above exceptional processing is not necessary even when the currently target macroblock is an intra macroblock according to the present modification.

While the invention has been described in detail, the foregoing description is in all aspects illustrative and not restrictive. It is therefore understood that numerous modifications and variations can be devised without departing from the scope.

EXPLANATION OF REFERENCE NUMERALS 1 image processor
2 encoder
3 controller
11 first processing unit
12 second processing unit
13 third processing unit
14 fourth processing unit
21 entire evaluation value arithmetic unit
22 partial evaluation value arithmetic unit
23 Sobel filtering unit
24 expected amount of code arithmetic unit
25 memory unit
26 correction unit

The invention claimed is:

1. An image processor comprising:
an encoder that performs encoding including quantization on an image signal; and
a controller that controls a quantization parameter in the quantization;
the controller including
a first processing unit that obtains a generated amount of code used for a first predetermined number of immediately preceding macroblocks;
a second processing unit that obtains an allowable amount of code available for a third predetermined number of immediately subsequent macroblocks including a currently target macroblock, based on a target amount of code for not more than a second predetermined number of macroblocks less than a total number of macroblocks included in one frame, and the generated amount of code obtained by the first processing unit;
a third processing unit that obtains an expected amount of code expected to be used for the third predetermined number of macroblocks; and
a fourth processing unit that sets a quantization parameter of the currently target macroblock, based on the allowable amount of code obtained by the second processing unit and the expected amount of code obtained by the third processing unit.

2. The image processor according to claim 1, wherein the second processing unit determines,
when the first predetermined number is equal to or more than a value obtained by reducing the third predetermined number from the second predetermined number, a value obtained by reducing a generated amount of code used for (the second predetermined number minus the third predetermined number) of immediately preceding macroblocks from the target amount of code for the second predetermined number of macroblocks is the allowable amount of code, and when the first predetermined number is less than a value obtained by reducing the third predetermined number from the second predetermined number, a value obtained by reducing a generated amount of code used for the first predetermined number of immediately preceding macroblocks from a target amount of code for a sum of the first predetermined number and the third predetermined number of macroblocks is the allowable amount of code.

3. The image processor according to claim 1, wherein the third processing unit obtains the expected amount of code based on an attribute value of each of the third predetermined number of macroblocks, and determines the attribute value based on an activity evaluation value of an entire area of a macroblock.

4. The image processor according to claim 3, wherein the third processing unit further determines the attribute value based on a minimum of activity evaluation values of each of four side areas of the macroblock.

5. The image processor according to claim 3, wherein the third processing unit further determines the attribute value based on a maximum of results of edge detection of each of the four side areas of the macroblock.

6. The image processor according to claim 3, wherein the third processing unit further determines the attribute value based on whether or not the macroblock is an intra macroblock.

7. The image processor according to claim 3, wherein a reference amount of code when a quantization parameter is set at a reference value is preset corresponding to each of a plurality of attribute values, a plurality of parameter sets each having quantization parameters respectively corresponding to the plurality of attribute values is preset, and the third processing unit calculates the expected amount of code based on the reference amount of code for each of the plurality of parameter sets.

8. The image processor according to claim 7, wherein the third processing unit corrects the reference amount of code based on an actually generated amount of code.

9. The image processor according to claim 8, wherein the third processing unit calculates a corrected reference amount of code based on an actually generated amount of code when a quantization parameter is set at a value different from the reference value.

10. The image processor according to claim 8, wherein the third processing unit performs encoding with a quantization parameter of the reference value and corrects the reference amount of code based on an amount of code actually generated in the encoding.

11. The image processor according to claim 7, wherein a quantization parameter of an intra macroblock in each of the plurality of parameter sets is equal to or below a predetermined upper limit.

12. The image processor according to claim 7, wherein the fourth processing unit selects a parameter set that realizes a greatest expected amount of code equal to or less than the allowable amount of code of the plurality of parameter sets, and sets a quantization parameter of a currently target macroblock based on the parameter set.

13. The image processor according to claim 7, wherein the fourth processing unit selects a parameter set that realizes the expected amount of code closest to the allowable amount of code from the plurality of parameter sets, and sets a quantization parameter of a currently target macroblock based on the parameter set.

14. The image processor according to claim 7, wherein the fourth processing unit skips encoding of a currently target macroblock when a parameter set that causes the expected amount of code to be smallest is selected from the plurality of parameter sets and still the expected amount of code exceeds the allowable amount of code.

15. The image processor according to claim 12, wherein the fourth processing unit sets a quantization parameter of a currently target macroblock to a predetermined upper limit or smaller when the macroblock is an intra macroblock.

* * * * *